April 25, 1961     M. ROSENBLATT     2,981,882

STABILIZING CIRCUIT FOR DYNAMOELECTRIC MACHINES

Filed Oct. 27, 1958     2 Sheets-Sheet 1

INVENTOR:
MURRAY ROSENBLATT,

BY *(signature)*

HIS ATTORNEY.

April 25, 1961  M. ROSENBLATT  2,981,882
STABILIZING CIRCUIT FOR DYNAMOELECTRIC MACHINES
Filed Oct. 27, 1958                                           2 Sheets-Sheet 2

INVENTOR:
MURRAY ROSENBLATT,
BY *Melvin M. Goldenberg*
HIS ATTORNEY.

2,981,882
STABILIZING CIRCUIT FOR DYNAMOELECTRIC MACHINES

Murray Rosenblatt, Waynesboro, Va., assignor to General Electric Company, a corporation of New York Filed Oct. 27, 1958, Ser. No. 769,852

10 Claims. (Cl. 322—24)

This invention relates to regulating systems for dynamoelectric machines and, more particularly, to voltage regulating systems which act to increase the stability limits of synchronous dynamoelectric machines and the electric power systems to which such machines are connected.

In electrical power generating and transmission systems wherein a synchronous alternating current generator is supplying a system over a transmission line, it is important that synchronism be maintained between synchronous machines at separated locations on the system. As the load on the system changes, the ability of the machine to main synchronism may be limited in two senses; that is, as the load is gradually increased, every generating system will manifest what is termed a steady-state stability limit which may be expressed as some percentage of the maximum load capability of the synchronous generator. On the other hand, if large disturbances appear in the transmission system such as are caused by short circuits, suddenly applied loads and the like, another limit of stability is manifested which is termed the transient stability limit. This limit is likewise expressed as a percentage of the maximum load capability of the generator. The load on a generator supplying a transmission system is, of course, the real power capable of being delivered by the generator to the system. It is, therefore, advantageous to provide a means capable of improving the stability limits of the generator which is responsive to the rate of change of real power to supply a signal to the excitation or regulation system of the generator to vary the excitation in response to changes in the load or real power being consumed by the system. Such a signal is effective to damp oscillations in the generator rotor caused by changes in the load, which changes are continually occurring and subjecting the rotor to disturbances. Real power being delivered by a generator is, of course, equal to the voltage times the real or in phase component of current. It has been found that this value may be approximated very closely when the generator is operating in the neighborhood of rated load and fairly well when it is operating below rated load.

Therefore, it is an object of this invention to provide a novel voltage regulating system for a synchronous dynamoelectric machine connected to an electric power system which is responsive to the rate of change of real power being delivered by the generator to the system to supply a stabilizing signal effective to increase the stability limits of the system.

It is another object of this invention to provide a novel voltage regulating system for synchronous dynamoelectric machines which is responsive to electrical signals approximating the rate of change of power in the system supplied by the generator to derive a stabilizing signal to modify or alter the control signal supplied from a regulator controlling the output of the machine.

It is still another object of this invention to provide a novel voltage regulating system for a synchronous dynamoelectric machine connected to an electric power system which, by measuring the voltage and in phase current derives a signal proportional to the rate of change of real power in the system to supply a stabilizing signal to a voltage regulator.

Briefly, in one embodiment of the invention there is provided a network for deriving a voltage proportional to the positive phase sequence voltage of the generator and a second network for deriving a voltage proportional to the positive phase sequence current of the generator. Through the use of siutable addition circuits the voltages are combined to provide a signal which is differentiated to supply a stabilizing signal proportional to the rate of change of real power which is supplied to further means modifying the regulating signal supplied from a voltage regulator to the excitation system of the machine.

The features of my invention which I believe to be novel are set forth with particularity in the appended claims. My invention itself, however, both as to its organization and method of operation together with further objects and advantages thereof, may best be understood by reference to the following description taken in connection with the accompanying drawing, in which:

Figure 1:
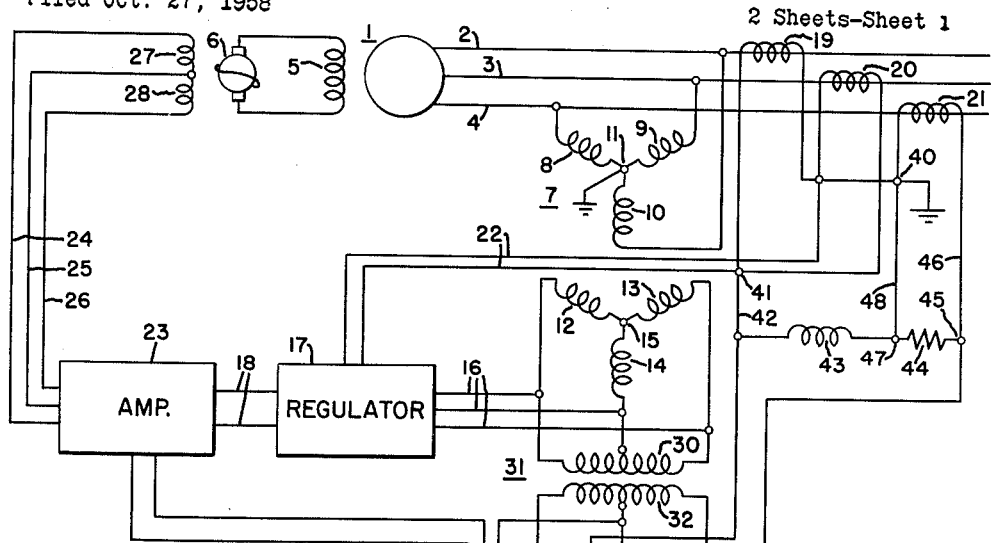
Figure 1 is a schematic illustration of an electrical generating system incorporating my invention.

Referring to Figure 1 of the drawing, which is in part in diagrammatic form and in part in schematic form, which illustrates circuits and connections of an embodiment of my invention, the invention is shown being applied to the regulation and control of a three phase synchronous alternating current generator. The generator 1 is provided with an armature to which the three terminal conductors 2, 3 and 4 are connected. The excitation circuit of the generator may be constituted by a field winding 5 illustrated schematically in this drawing. In this embodiment, the direct current voltage excitation of the field winding 5 is supplied by an amplidyne 6 which may be driven from the same shaft as is the generator by a prime mover (not shown). In order to regulate the output of the generator 1, a signal proportional to the generator voltage may be derived via a potential transformer connected in a typical Y connection and having the primary windings 8, 9 and 10 connected at one end to the conductors 2, 3 and 4 and at their center to a ground or neutral connection 11. The secondary of the potential transformer may be similarly Y connected and constituted by the windings 12, 13 and 14 connected at their common ends to a neutral point 15 and at their free ends to the conductors 16. The conductors 16 are connected to a regulator 17 which may be of any suitable type. Thus, generally speaking, the regulator will constitute a device for comparing the voltage signal supplied via the conductor 16 with an adjustable reference signal and supplying a difference or control signal to its output conductors 18. It may be found desirable to provide also that the regulating signals supplied via the conductors 18 be made responsive in some manner also to the generator current. This may be accomplished by the provision of current transformers 19, 20 and 21 connected inductively with each of the conductors 2, 3 and 4 respectively. A signal may, therefore, be derived from one of the current transformers as, for example, the current transformer 20 supplied via the conductors 22 to the regulator 17. As stated, the control difference signal from the regulator 17 is supplied to the conductors 18 which may be amplified by an amplifying device 23 and supplied via the conductors 24, 25 and 26 to a pair of fields 27 and 28 of the amplidyne exciter 6. In this embodiment of the invention, the fields 27 and 28 may be buck and boost fields effective to increase or decrease the output of the amplidyne exciter 6 to the generator field 5 depending upon the direction of current flow in these fields.

Figure 3A:
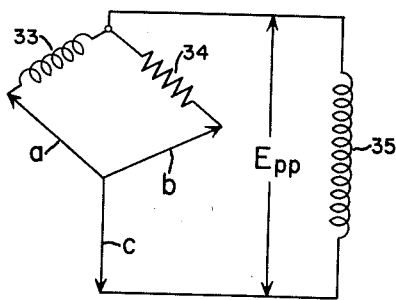
Figures 3A and 3B are vector elementary diagrams of signals present in one portion of my invention.
Figure 3B:
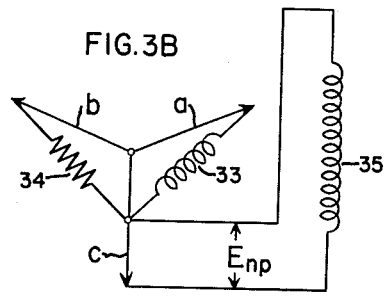

In accordance with my invention, I provide that the regulating signal developed in the regulator 17 and supplied via the conductors 18 be modified by the addition thereto of a stabilizing signal responsive to the rate of change of load on the dynamoelectric machine. Means whereby the stabilizing signal may be derived are illustrated in Figure 1. The voltage developed on potential transformer 7 is supplied to the primary winding 30 of a transformer 31. As may be seen in the drawing, one end of the primary winding 30 is connected to an end of the secondary winding 12 of the transformer 7 while the other end of the primary winding 30 is connected to an end of the secondary winding 13 of the transformer 7 while a center tap connection is provided between an end of the secondary winding 14 and a center tap on the secondary winding 30. The transformer 31 supplies a signal proportional to generator voltage through a secondary winding 32 to a positive phase sequence network constituted by a reactor 33, a resistor 34 and a primary winding 35 of a transformer 36. Referring now to Figures 3A and 3B of the drawing, the operation of this circuit may be described. If the voltages in the three phases of the generator 2 are designated phases $a$, $b$ and $c$, the voltage vectors illustrated in Figure 3A and given these reference designations will represent their magnitudes and instantaneous directions while the voltages will develop voltages across the reactor 33, resistor 34 and the transformer primary 35 having vector positions represented by the positions of the elements in this figure. Figure 3A illustrates the relative voltages for a clockwise or positive phase sequence rotation of the vectors and it may be seen that a voltage $E_{pp}$ appears across the primary winding 35. If the voltage vectors $a$, $b$ and $c$ are rotated in the opposite or negative direction as illustrated, then the voltage represented by the arrow $E_{np}$ will be developed across the transformer primary 35 as illustrated in Figure 3B. From a comparison of the voltages $E_{pp}$ and $E_{np}$, it may be seen that the output voltage is small for negative phase sequence components of voltage while for positive phase sequence components of voltage full output voltage is obtained. This voltage is combined with a voltage proportional to the positive phase sequence current in a manner and for a purpose to be described hereinafter.

Referring again to Figure 1 of the drawing, means for deriving a voltage proportional to the positive phase sequence current may be constituted by the provision of the three current transformers 19, 20 and 21, each one inductively associated with the voltages appearing on the conductors 2, 3 and 4 respectively. The current transformers 19, 20 and 21 are connected in a Y connection having a neutral or ground point 40. Connected to a junction point 41 of one end of each of the transformers 19 and 20 is a conductor 42 to which is connected a reactor 43 and a resistor 44 in series with each other. The resistor 44 is returned to a junction 45 and thence via a conductor 46 to one end of the current transformer 21. The junction 47 of the reactor 43 and resistor 44 is returned via a conductor 48 to the neutral point 40. The current transformers 19, 20 and 21 are connected in a positive phase sequence relationship such that the voltage appearing from junction 41 to junction 45 is proportional to the positive phase sequence current being supplied by the machine.

Figure 4A:
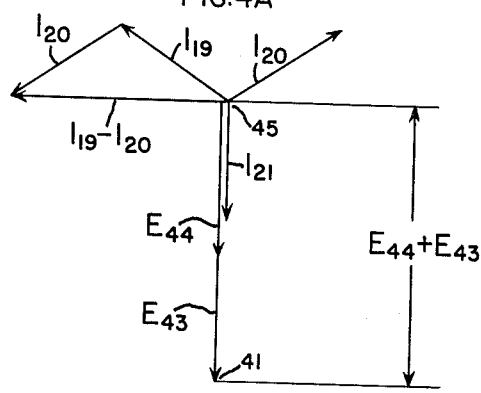
Figures 4A and 4B are vector diagrams of the signals available in another portion of my invention.
Figure 4B:
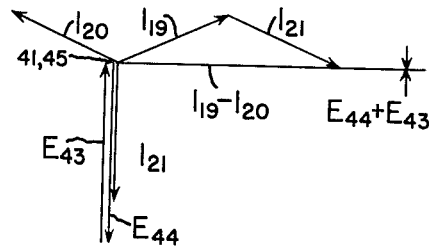

For an understanding of this circuit, reference may be had to Figures 4A and 4B of the drawing. In Figure 4A, the vectors $I_{19}$, $I_{20}$ and $I_{21}$ represent the magnitude and direction of the currents appearing in the current transformers 19, 20, and 21 respectively. As may be seen by referring to Figure 1 of the drawing, one side of the transformer 20 is returned to one side of the transformer 19 so that the currents appearing therein are subtracted from each other and therefore the vector designated $I_{19}$—$I_{20}$ represents the magnitude and direction of the resultant current. The current transformer 21, as may be seen, is connected across resistor 44 and causes a voltage to appear on this resistor which is represented by the voltage vector $E_{44}$. As the current transformers 19 and 20 are connected across reactor 43, the current resulting from the addition of their currents causes a voltage on the reactor 43 as a voltage which is in phase with the voltage across the resistor 44 and is illustrated by the vector $E_{43}$. The resultant of the two voltages, as stated above, appears across the junction points 41 and 45 and as a magnitude equal to a value of $E_{44}+E_{43}$. In Figure 4B of the drawing, when the negative phase sequence of currents is considered it may be seen that when $I_{20}$ is subtracted from $I_{19}$ the vector representing this current is opposite in direction to the vector representing this current in Figure 4A. Consequently, the direction of the voltage through the reactor 43 is reversed and substantially zero voltage appears across the junction points 41 and 45 so that the value of $E_{44}+E_{43}$ is substantially equal to zero.

Referring again to Figure 1 of the drawing, circuits for combining voltages produced by the positive phase sequence voltage and current networks described above are provided. One of these circuits is constituted by a transformer 50 having a primary winding 51. It may be seen that the primary winding 51 is connected in a series circuit including one-half of the primary winding 35 of the transformer 36, the reactor 43 and resistor 44. Thus the voltage appearing across the primary winding 51 is a vector addition of a voltage proportional to the positive phase sequence current and one-half of the voltage proportional to the positive phase sequence voltage. This voltage induces a voltage in the primary winding 52 of the transformer 50 which is rectified by a full-wave rectifier 53. A second local circuit for obtaining the desired stabilizing voltage comprises the transformer 55 having a primary winding 56. The primary winding 56 is also connected across a series combination of resistor 44, reactor 43 and one-half of the primary winding 35. However, as may be seen, it is connected in such a manner that the phase relationship of the voltage component from the primary winding 35 is opposite to that which was supplied to the primary winding 51 of the transformer 50. Thus the magnitude of the voltage developed across the primary winding 56 is proportional to the vector difference of voltages proportional to the positive phase sequence voltage and current. This voltage induces a voltage in the secondary winding 57 which is rectified by a full-wave rectifier 58.

Figure 5A:
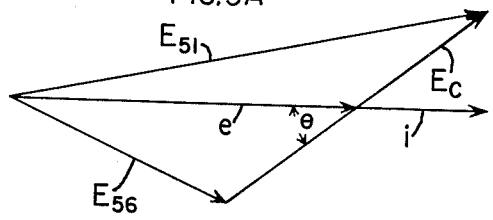
Figures 5A and 5B are vector diagrams illustrating how the derived signals may be combined to produce a signal proportional to the in phase current being delivered by the generator to a system.
Figure 5B:
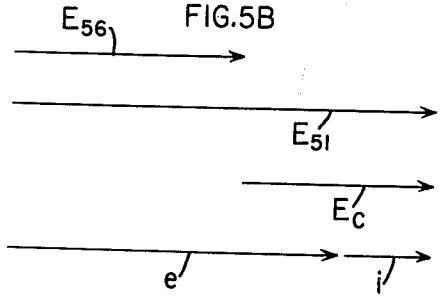

If circuit components are selected so that the magnitude of the voltage proportional to the positive phase sequence current is small compared to the voltage proportional to the positive phase sequence voltage, the result is that the voltage on transformer 50 minus the voltage on transformer 55 approximates twice the in phase or kilowatt components of current regardless of power factor angle. This may be shown by reference to Figures 5A and 5B. In Figure 5A, the vector $E_{51}$ represents the voltage on the primary winding 51 while the vector $E_{56}$ represents the voltage on the primary winding 56. When the vector $E_{56}$ is subtracted from the vector $E_{51}$, the resultant is the vector $E_c$ which represents a voltage proportional to twice the positive phase sequence current. For unity power factor, the vectors $E_{51}$ and $E_{56}$ would be in phase as shown in Figure 5B and their subtraction yields the vector $E_c$. If the vector $e$ represents one-half of the positive phase sequence voltage and the vector $i$ represents a voltage proportional to the positive phase sequence current at unity power factor, it may be seen that the vector $E_c$ is approximately equal to twice vector $i$. Referring again to Figure 5A, it may therefore be seen that vector $E_c = 2\, i \cos \theta$.

Thus if the D.C. voltage outputs of the rectifiers 53 and 58 are subtracted from each other and the voltage difference filtered by a filter constituted by a capacitor 60 and a resistor 61, the voltage appearing across the capacitor 60 will have a magnitude represented by the vectors $E_c$ and, as may be seen, is proportional to twice the value of the in phase current represented by the positive phase sequence current represented by the vector $i$.

Referring again to Figure 1 of the drawing, it may be seen that an alternating voltage is developed across a secondary winding 65 of the transformer 36 which is proportional to the positive phase sequence voltage. This voltage is rectified by a full-wave rectifier 66 and filtered by a resistor 67 and capacitor 68. Conductors 69 and 70 add the voltage across the capacitor 60 which, as pointed out above, represents the difference of the voltages on the transformers 50 and 55 to the output voltage of the rectifier 66 developing a net voltage which is proportional to the positive phase sequence voltage of the system plus a voltage proportional to the in phase component of the positive phase sequence current of the system. This voltage is supplied to a differentiating network constituted by a capacitor 71, an adjustable resistance 72 and a fixed resistance 73 and is supplied via the conductors 74 and 75 to the amplifier 23. A pair of reversely connected semiconductor diodes 76 having a critical reverse voltage characteristic may be connected across the conductors 69 and 70 to limit the magnitude of the stabilizing signal by breaking down to conduct when the voltage across it exceeds a predetermined value in either direction.

In order that this circuit may be understood, it is deemed desirable to present a brief derivation of the expressions establishing the relationship of the voltages as derived and added by the illustrated circuits. Thus if P represents power, E voltage and I current $$P = EI$$

When this expression is differentiated, the expression $$\frac{dP}{dT} = \frac{E\,dI}{dT} + \frac{I\,dE}{dT}$$

is obtained. At values of rated generator load, per unit E, per unit I cos $\theta$, and per unit P are each 1. Thus, the expression above becomes $$\frac{dP}{dT} = \frac{dI}{dT} + \frac{dE}{dT}$$

As explained above, the voltage supplied to the differentiating network is proportional to $$2I_{ps} + E_{ps}$$

where $I_{ps}$ is the positive phase sequence current and $E_{ps}$ equals the positive phase sequence voltage and, as explained in conjunction with Figures 5A and 5B, $2I_{ps}$ is proportional to the in phase component of the positive phase sequence current. Therefore, when the voltages are added and differentiated by the differentiating network, the resultant voltage is approximately equal to $$k_1 \frac{dI}{dT} + k_2 \frac{dE}{dT}$$

where $k_1$ and $K_2$ are determined by the turns ratios of transformers 50 and 55 respectively and by the other circuit constants or by suitable choice of $k_1$ and $K_2$ to $$\frac{dP}{dT}$$

It may thus be seen that the signal supplied via the conductors 74 and 75 represents a signal proportional to the rate of change of power delivered by the generator and proportionality is valid for a wide range of values at or near rated load of the generator under which circumstances most generators ordinarily operate.

Figure 2:
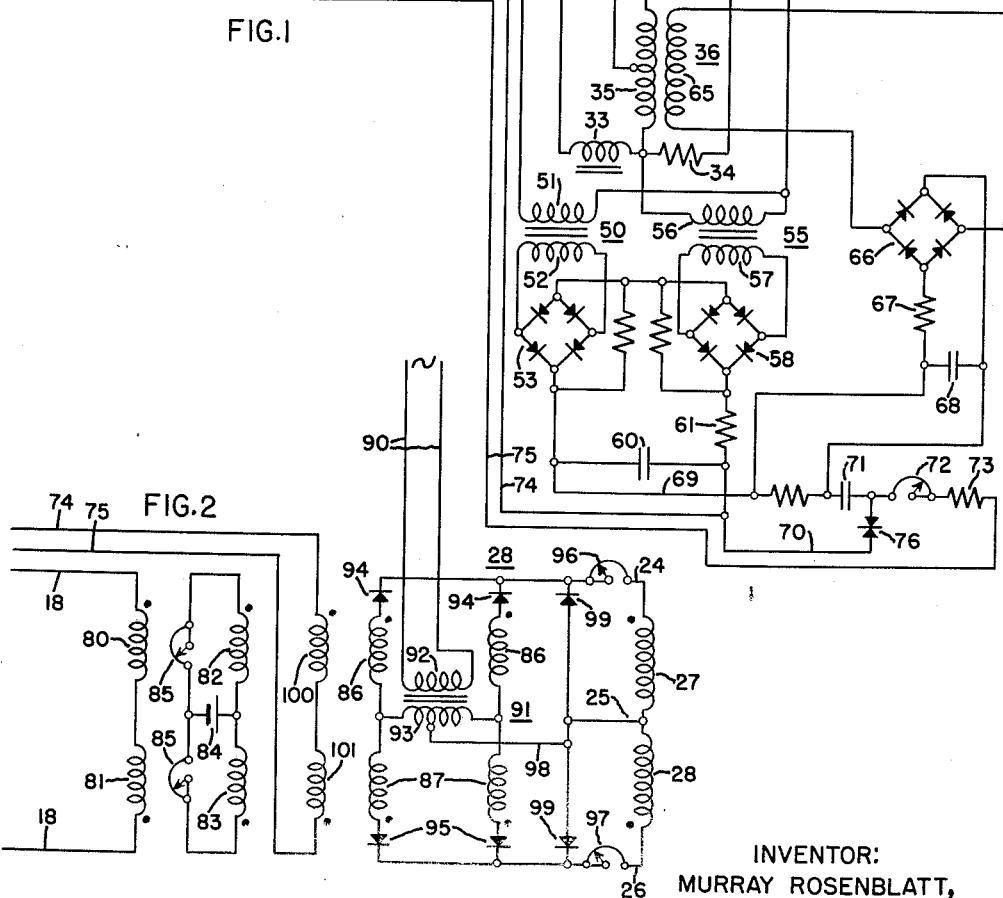
Figure 2 is a schematic illustration of a specific means whereby a stabilizing signal may be used to modify a regulating signal.

Referring to Figure 2 of the drawing, I illustrate an amplifier whereby the stabilizing signal supplied via the conductors 74 and 75 may be combined with the regulating signal from the regulator 17 to modify the regulating signal to vary the excitation of the machine 1 in response to the rate of change of load on the machine. This circuit is shown for purposes of illustration only as it is obvious that other and different types of amplifiers and/or addition networks may be used to combine the regulating and stabilizing signals to control the excitation of the machine 1. In this figure, the regulating signal developed on the conductors 18 is supplied to a pair of control windings 80 and 81 provided on parallel magnetic amplifiers constituted by coils wound on separate magnetic cores. Each magnetic amplifier may have provided thereon bias windings 82 and 83 supplied with direct current from a source illustrated as a battery 84. Connected in series with each of the bias windings 82 and 83 there may be provided adjustable resistances 85 for the purposes of balancing the bias signal applied to each of the magnetic amplifiers. Each of the magnetic amplifiers is provided with a pair of main load windings 86 and 87 to which is supplied an alternating current. The alternating supply may be constituted by conductors 90, a transformer 91 having a primary winding 92 and a secondary winding 93 connected to the windings 86 and 87. The alternating current supplied through the transformer 91 is rectified by a rectifying device 94 associated with the main load windings 86 and rectifying devices 95 associated with the main load windings 87. The D.C. output of each of the magnetic amplifiers is supplied through the series connected adjustable balancing resistances 96 and 97 to the buck and boost field windings 27 and 28 of the amplidyne exciter. The conductor 25 connected to the junction of the fields 27 and 28 is returned via a conductor 98 to a center tap on the transformer 93 thus completing a circuit for the flow of direct current in the field windings 27 and 28. As may be seen, the flow of direct current in the field winding 27 is in a direction opposite to the current flow in field winding 28. As indicated by the polarity dots, they are physically wound in the amplidyne 6 so that if the current flow in one is greater than the current flow in the other, the excitation will be such to increase or decrease the output of the amplidyne and consequently the output of the generator 1. Also, rectifying devices 99 may be connected across each of the fields 27 and 28 to function as freewheeling rectifiers. Wound on the magnetic core on which the coils 80, 82 and 86 are wound is another coil 100, while a coil 101 is wound on the core on which the coils 81, 83 and 87 are wound. These coils are energized by the direct current stabilizing signal proportional to the rate of change of power supplied from the integrating network as described above. It may be seen that each of the coils is wound on its respective core in such a manner to have opposite magnetizing effects on their respective coils. Thus when the coils 80 and 81 are considered, an increased current flow therethrough may have the effect of increasing the saturation in the core associated with the coil 80 and decreasing the saturation in the core associated with the coil 81. Thus if the exciter field 27 is designated as the boost field, a regulating signal may be provided which will increase in one polarity due to a drop in generator output and supplied to the windings 80 and 81 and will be effective to drive the core on which the windings 80 and 86 are wound further toward saturation while decreasing the flux density of the core on which the cores 81 and 87 are wound. This will result in a greater direct current through the boost field 27 and a lesser direct current through buck field 28 to increase the excitation voltage supplied to the field winding 5 of the generator 1. On the other hand, an increase in the generator output will have opposite effect as the core on which the windings 81 and 87 are wound will be the one driven toward saturation.

The effect of the stabilizing signal is that when the rate of change of power supplied by the generator 1 is large and in a positive direction, as may occur when a large load is suddenly placed on the system, the regulating system will respond by attempting to increase the generator output. The mechanical constants of the machine may be such that a mechanical oscillation of the rotor will ensue. However, a negative direct current signal from the integrating circuit will be supplied to the control windings 100 and 101 to modify the regulating signal and damp such oscillations. In the event of a fault on the system the voltage may suddenly drop while the current increases, again resulting in a change of power but in a negative direction. The stabilizing signal will then be positive and will oppose the action of the regulating system to again damp the generator.

While the invention has been described by reference to a particular embodiment thereof, it will be understood that numerous modifications may be made by those skilled in the art without departing from the invention. I, therefore, aim in the appended claims to cover all such equivalent variations as come within the true spirit and scope of my invention.

What I claim as new and desire to secure by Letters Patent of the United States is:

1. A regulating system comprising a first positive phase sequence network, means supplying voltage proportional to a source voltage to said first network, a second positive phase sequence network, means supplying voltage proportional to a source current to said second network, means for deriving a signal proportional to the sum of the voltages developed by said networks, means for deriving a signal proportional to the difference of the voltages developed by said networks, means for combining said derived signals, means for deriving a signal proportional to the voltage developed by said first network and means for adding said last-mentioned signal to said combined signals.

2. A regulating system comprising a first positive phase sequence network, means supplying voltage proportional to a source voltage to said first network, a second positive phase sequence network, means supplying voltage proportional to a source current to said second network, means for deriving a signal proportional to the sum of the voltages developed by said networks, means for deriving a signal proportional to the difference of the voltages developed by said networks, means for combining said derived signals, means for deriving a signal proportional to the voltage developed by said first network, means for adding said last-mentioned signal to said combined signals and means for differentiating said added signals.

3. A regulating system for dynamoelectric machines including a field winding and an armature, a first positive phase sequence network, means for supplying a voltage proportional to the armature voltage to said first network, a second positive phase network, means for supplying a voltage proportional to the armature current to said second network, means for deriving a signal proportional to the sum of the voltages developed by said networks, means for deriving a signal proportional to the difference of the voltages developed by said networks, means for combining said derived signals, means for deriving a signal proportional to the voltage developed by said first network, means for adding said last-mentioned signal to said combined signals, and means for controlling the field winding of the machine in response to said added signals.

4. A regulating system for dynamoelectric machines including a field winding and an armature, a first positive phase sequence network, means for supplying a voltage proportional to the armature voltage to said first network, a second positive phase network, means for supplying a voltage proportional to the armature current to said network, means for deriving a signal proportional to the sum of the voltages developed by said networks, means for deriving a signal proportional to the difference of the voltages developed by said networks, means for combining said derived signals, means for deriving a signal proportional to the voltage developed by said first network, means for adding said last-mentioned signal to said combined signals, means for differentiating said added signals and means for controlling the field winding of the machine in response to said differentiated signals.

5. A regulating system for dynamoelectric machines comprising means responsive to output voltage of said machine for deriving a regulating signal, means responsive to a transient condition of said machine for deriving a stabilizing signal comprising a first network for deriving a signal proportional to the positive phase sequence armature voltage, a second network for deriving a signal proportional to the positive phase sequence armature current, means for deriving signals representing the sum and difference of the signals derived by said networks, means for combining the signals derived by said last-mentioned means, means for adding said combined signals with a signal derived by said first network, means for differentiating said added signals, and means for combining said regulating signal with said stabilizing signal for modifying said regulating signal.

6. A regulating system for dynamoelectric machines comprising means responsive to output voltage of said machine for deriving a regulating signal, means responsive to a transient condition of said machine for deriving a stabilizing signal comprising a first network including a reactor and resistor connected in series, transformer means for supplying a voltage proportional to the output voltage of said machine to said first network, a second network including a reactor and a resistor connected in series, current transformer means supplying a voltage proportional to the output current of said machine to said second network, first rectifying means coupled to said first and second networks for deriving a signal proportional to the sum of the voltages developed by said networks, second rectifying means coupled to said first and second networks deriving a signal proportional to the difference of the voltages developed by said networks, means for combining said signals, third rectifying means coupled to said first network for deriving a signal proportional to the voltage developed by said first network, means for adding said last-mentioned signal to said combined signals, means for differentiating said added signals to derive the stabilizing signal, and means for combining said regulating signal with said stabilizing signal for modifying said regulating signal.

7. A regulating system for dynamoelectric machines comprising means responsive to output voltage of said machine for deriving a regulating signal, means responsive to a transient condition of said machine for deriving a stabilizing signal comprising potential transformer means, a first network including a reactor and a resistor in series connected across said potential transformer means and a first transformer having a primary winding having one end connected between said reactor and said resistor, and its other connected to said potential transformer means, a second network including a reactor and a resistor connected in series and current transformer means, a second transformer having a primary winding connected in a circuit including said resistor, said reactor of said second network and a portion of the primary winding of said first transformer, a first rectifying means, said second transformer having a secondary winding connected to said first rectifying means, a third transformer having a primary winding connected in a circuit including said reactor, said resistor of said second network and another portion of the primary winding of said first transformer, a second rectifying means, said third transformer having a primary winding connected to said second rectifying means, means for combining the outputs of said first and second rectifying means, a third rectifying means, said first transformer having a secondary connected to said third rectifying means, means for adding the output of said third rectifying means to said combined outputs, means for differentiating said added outputs to derive said stabilizing signal, and means for combining said regulating signal with said stabilizing signal for modifying said regulating signal.

8. A regulating system for dynamoelectric machines comprising means responsive to output voltage of said machine for deriving a regulating signal, means responsive to a transient condition of said machine for deriving a stabilizing signal comprising a first network for deriving a signal proportional to the positive phase sequence armature voltage, a second network for deriving a signal proportional to the positive phase sequence armature current, means for deriving signals representing the sum and difference of the signals derived by said networks, means for combining the signals derived by said last-mentioned means, means for adding said combined signals with a signal derived by said first network, means for differentiating said added signals, amplifying means including a plurality of control elements, means for imposing said regulating signal and said stabilizing signal on said control elements to vary the output of said amplifying means, and means responsive to the output of said amplifying means to control the output of said machine.

9. A system as defined in claim 8 including means to limit said stabilizing signal.

10. A system as defined in claim 8 wherein said amplifying means comprises a magnetic amplifier and said control elements comprise control windings thereof.

References Cited in the file of this patent

UNITED STATES PATENTS

| | | |
|---|---|---|
| 2,571,827 | Bradley | Oct. 16, 1951 |
| 2,839,694 | Fairweather et al. | June 17, 1958 |

UNITED STATES PATENT OFFICE
CERTIFICATE OF CORRECTION

Patent No. 2,981,882                              April 25, 1961

Murray Rosenblatt

It is hereby certified that error appears in the above numbered patent requiring correction and that the said Letters Patent should read as corrected below.

Column 1, line 26, for "main" read -- maintain --; column 2, line 10, for "siutable" read -- suitable --; column 8, line 46, after "networks" insert -- for --.

Signed and sealed this 14th day of November 1961.

(SEAL)
Attest:

ERNEST W. SWIDER                              DAVID L. LADD
Attesting Officer                              Commissioner of Patents

USCOMM-DC